(12) United States Patent
Benedikt (10) Patent No.: US 8,555,076 B2
(45) Date of Patent: Oct. 8, 2013

(54) UNIQUE BLOCK HEADER PATTERNS FOR MEDIA VERIFICATION

(75) Inventor: Mark L. Benedikt, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/252,720

(22) Filed: Oct. 4, 2011

(65) Prior Publication Data

US 2012/0030473 A1 Feb. 2, 2012

Related U.S. Application Data

(62) Division of application No. 11/182,301, filed on Jul. 15, 2005, now Pat. No. 8,051,291.

(51) Int. Cl.
*G06F 21/00* (2013.01)

(52) U.S. Cl.
USPC ............ 713/182; 713/176; 380/277; 380/278

(58) Field of Classification Search
USPC ............ 713/176, 182; 380/277–278; 717/143
See application file for complete search history.

(56) References Cited

U.S. PATENT DOCUMENTS

| | | | | |
|---|---|---|---|---|
| 6,034,618 A * | 3/2000 | Tatebayashi et al. | .......... | 340/5.8 |
| 6,477,124 B2 | 11/2002 | Carson | | |
| 6,515,819 B1 | 2/2003 | Schmidt et al. | | |
| 6,870,875 B1 * | 3/2005 | Partyka | ......................... | 375/132 |
| 6,905,750 B2 * | 6/2005 | Nee | ............... | 428/64.1 |
| 7,064,689 B2 | 6/2006 | Hori | | |
| 7,266,661 B2 | 9/2007 | Walmsley | | |
| 2002/0123968 A1 | 9/2002 | Okayama et al. | | |
| 2002/0169961 A1 | 11/2002 | Giles et al. | | |
| 2004/0123111 A1 * | 6/2004 | Makita et al. | ................. | 713/176 |
| 2005/0005137 A1 | 1/2005 | Benedikt | | |
| 2007/0016787 A1 | 1/2007 | Benedikt | | |

FOREIGN PATENT DOCUMENTS

| | | | |
|---|---|---|---|
| EP | 0301909 A2 * | 7/1988 | |
| WO | WO 03/054878 A1 | 7/2003 | |

OTHER PUBLICATIONS

Restriction Requirement dated Jun. 25, 2009, U.S. Appl. No. 11/182,301, filed Jul. 15, 2005.
Response to Restriction Requirement dated Jul. 24, 2009, U.S. Appl. No. 11/182,301, filed Jul. 15, 2005.
Office Action dated Oct. 13, 2009, U.S. Appl. No. 11/182,301, filed Jul. 15, 2005.
Response to Office Action dated Feb. 16, 2010, U.S. Appl. No. 11/182,301, filed Jul. 15, 2005.
Office Action dated May 27, 2010, U.S. Appl. No. 11/182,301, filed Jul. 15, 2005.
Response to Office Action dated Nov. 29, 2010, U.S. Appl. No. 11/182,301, filed Jul. 15, 2005.

(Continued)

*Primary Examiner* — Thanhnga B Truong
(74) *Attorney, Agent, or Firm* — Vierra Magen Marcus LLP (57) ABSTRACT

Authenticating the source of digital media is performed by using unique, randomly generated variably encoded frequency patterns to create mastering specific, profiles for sets end user media which can be verified by a manufacturer. A method for verifying the authenticity of an optical storage device includes the steps of: reading a randomly generated signature key value for the optical storage device; determining manufacturing information for the optical storage device; and matching read randomly generated signature key values and manufacturing information with known valid key the to determine the authenticity of the device.

11 Claims, 8 Drawing Sheets

(56) References Cited

OTHER PUBLICATIONS

Office Action dated Feb. 15, 2011, U.S. Appl. No. 11/182,301, filed Jul. 15, 2005.

Response to Office Action dated May 16, 2011, U.S. Appl. No. 11/182,301, filed Jul. 15, 2005.

Notice of Allowance and Fee(s) Due dated Jul. 22, 2011, U.S. Appl. No. 11/182,301, filed Jul. 15, 2005.

* cited by examiner

UNIQUE BLOCK HEADER PATTERNS FOR MEDIA VERIFICATION

CLAIM OF PRIORITY

This divisional application claims priority to U.S. patent application Ser. No. 11/182,301 filed on Jul. 15, 2005, entitled "UNIQUE BLOCK HEADER PATTERNS FOR MEDIA VERIFICATION", commonly assigned, and of which is hereby incorporated by reference for all purposes.

BACKGROUND

1. Field of the Invention

The present invention is directed at verifying the authenticity of the source of an optical storage media device.

2. Description of the Related Art

Optical media is widely used for recording and storing digital data, such as software products, document data, and image data. Digital data such as software products and document data recorded on CD-ROMs are subject to unauthorized copying. There are numerous copy protection technologies and schemes in place to thwart counterfeiters. Technological developments which have made it easier for software manufacturers to provide inexpensive products in the marketplace have also made it easier for software pirates to cheaply replicate and profitably market large volumes of optical media such as CDs and DVDs.

There are many different types of software piracy. End-user piracy is the copying of software without appropriate licensing for each copy. Pre-installed software piracy is when an illicit computer manufacturer takes one copy of software and illegally installs it on more than one computer. Internet piracy is the downloading of unauthorized software over the Internet. Counterfeiting is the making and distribution of illegal copies of software in packaging that replicates a legitimate manufacturer's packaging. Counterfeit media range in quality from hand-labeled recordable CDs to high quality replicas of genuine installation CD's and DVD's.

To defeat counterfeit media, a number of techniques are used. One scheme requires product validation by the software manufacturer upon installation of the software of an end user machine. Communication must be made between an installed version of the software and the manufacturer site before the software will run effectively on the end computer. Another method involves software manufacturers creating a unique physical signature or watermark in the pit/land structure of optical media. Although this signature could be created for each disk, typically this type of signature is created for an entire version or "run" of software as pressed on media, due to the difficulties involved in the manufacturing process.

One such physical signature uses latency data encoded into the disk in a manner not generally detectable to the user. Normally, data is written to a conventional optical disc master so that the data may be subsequently recovered uniformly while the photoresist (photosensitive) coated glass master disc is rotated at a constant linear velocity. The fixed frequency T is selected to write an extended frequency modulation (EFM) signal on the disk and the rotational velocity of the disc is successively decreased as the writing assembly is moved from the inner diameter (ID) to the outer diameter (OD). The EFM signal is a high frequency two-state signal with pulse durations that correspond to the range of data symbols to be written to the disc. In this way, all of the pits and lands of a given symbol length have nominally the same physical size regardless of location on the disc. The data are subsequently retrieved at a substantially constant readback data rate (frequency) and the linear velocity of the disc is adjusted to maintain this data rate within a selected range.

In one example of a physical latency watermark, a digital signature is "baked" into the media by selectively changing the rate at which data appears on at least certain locations on the disc. Some of the data symbols of track are written by at a nominal data rate, while others are written by the at a different rate (in this case, a higher or lower rate), so each symbol of track is substantially shorter or longer in length as compared to the nominal lengths of the symbols of a nominal track. This increase or decrease in data rate can be readily accomplished by increasing the timing frequency F, or the rotational velocity, V of the disc during writing operation of the glass master. If this signature is provided on a master disk, these changes are subsequently transferred to all disks in the resulting production run through an electroplating process metal of transferring the digital bits from "father" to "mother" to "son" (a.k.a "stamper"). This process is also known in the trade as "generational metalwork". The stamper is the entity that is mounted into the injected molding machine mold cavity and is the negative of the final playback image found on the resulting CD or DVD.

In some cases, the variation in latency can be subtle enough so that the change does not affect the reading device's ability to recover the data from the end-user disk. However, this information latency variation is not normally detectable to the end-user user in the normal course of the installation process. This specialized or custom information can be used by a read back system to determine the authenticity or "genuineness" of the disk.

SUMMARY

Authenticating the source of digital media is performed by using unique, randomly generated variably encoded frequency patterns to create mastering specific, profiles for sets of end user media which can be verified by a manufacturer.

In one embodiment, a method for verifying the authenticity of an optical storage device is provided. The method includes the steps of: reading a randomly generated signature key value from a given piece of optical media; determining the manufacturing information as extracted from for the optical storage device; and then matching previously generated and stored randomly generated signature key values plus manufacturing information with the known valid key the to determine the authenticity of the device.

In an alternative embodiment, a method for manufacturing of optical media is provided. The method may include the steps of: generating a random latency pattern for a disk mastering device; creating a master disk including the random physical latency pattern; creating a plurality of optical storage disks the random physical latency pattern and common manufacturing information; and determining a signature key based on the random physical latency pattern.

In another embodiment, an optical storage medium is provided. The optical storage medium includes one or more data structures including data stored on a disk. Media creation information stored on the disk and the disk includes a plurality of pit and land structures having a randomly generated size pattern. The randomly generated size pattern is created from a random generated input based on at least one seed value.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

A unique solution to authenticating the source of digital media and in particular, optical disks is provided. Unique, randomly generated variably encoded frequency patterns are used to create mastering specific, profiles for sets end user media. A disc master is created with a unique signature and a signature key is provided to a disk manufacturer. The uniqueness of the profile can be created by a random number generation algorithm (symmetric or asymmetric) to drive the creation of a pit/land structure pattern which will be written to the master by an EFM encoder and laser beam recorder. The signature key for the unique frequency signature can be later extracted from the disk and verified by a disk manufacturer or other verification entity. This enables a greater number of batches to be given their own media specific identification.

Figure 1:
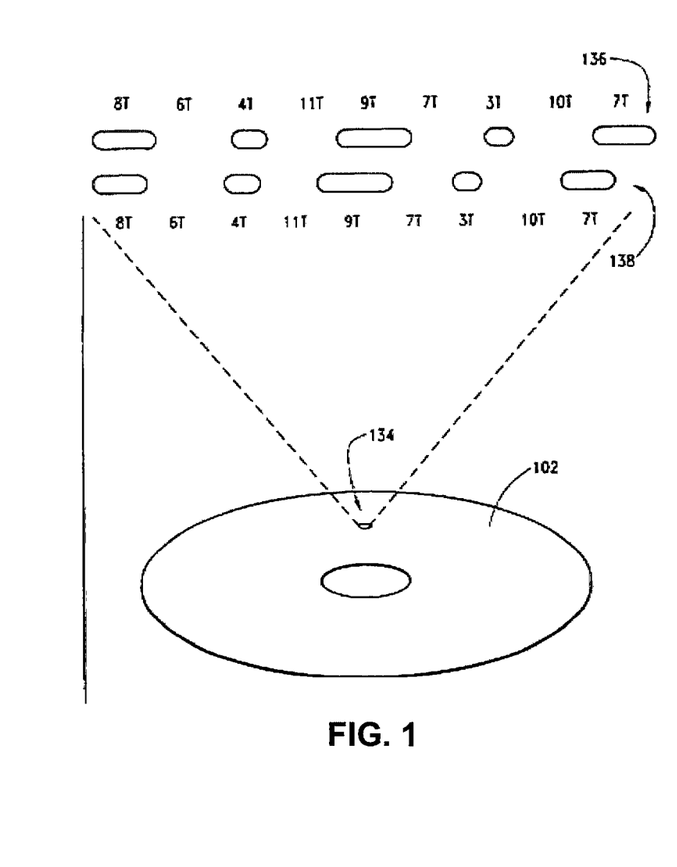
FIG. 1 is a depiction of FIG. 2 of U.S. Pat. No. 6,477,124 illustrating a localized change in the rate at which data are written to an optical disk.
Figure 2:
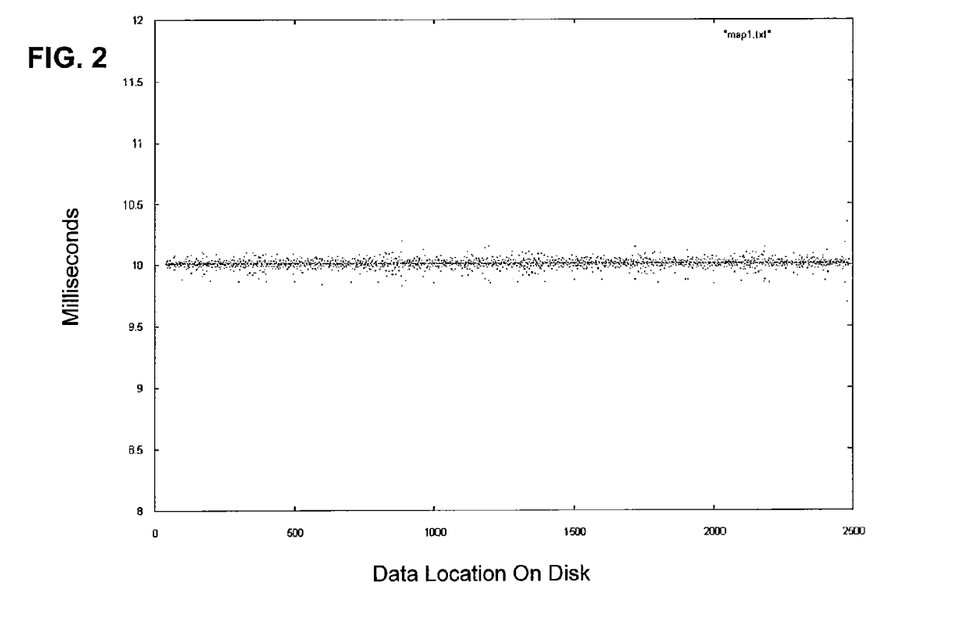
FIG. 2 is a graph of seek times to data locations on a disk for which a signature pattern is not present.

FIG. 1 is a depiction of FIG. 2 of U.S. Pat. No. 6,477,124 and illustrates a small portion 134 of a disc 102. The disk 102 has been magnified to illustrate portions of a pair of adjacent tracks 136, 138 to which data have been recorded as a series of pits and lands (the pits are denoted as ovals which extend into the disc at a selected depth). For simplicity of illustration, the same data symbol pattern is shown for each of the tracks 136, 138 (i.e., the sequence 8T, 6T, 4T, 1T, 9T, 7T, 3T, 10T, and 7T), although typically each track will store a different set of patterns. A recording system as illustrated in the '124 patent can selectively change the rate at which data appear on at least certain locations on the disc 102. FIG. 2 illustrates the manner in which this is preferably accomplished.

The data symbols of track 136 are written at a nominal data rate, so that the pit and land lengths shown therein are representative of the nominal lengths for remaining portions of the disc. However, the data symbols of track 138 are written at a different rate (in this case, a higher rate), so each symbol of track 138 is substantially shorter in length as compared to the nominal lengths of the symbols of track 136. Such increase in data rate can be readily accomplished by a write system well known in the art by increasing a timing frequency T, or by instructing the motor rotational velocity of the disc (or both). Depending upon the change in data rate and the relative difference in timing of the respective tracks, a read back system, should still be able to lock onto the higher frequency of the data of track 138. Nevertheless, as illustrated in prior art, this frequency variation can comprise a signature when the disk is read serially.

As will be understood by one of average skill in the art, when one plots the seek times of a disk relative to the location of data recorded on a disk with an all nominal pit and land structure pattern (such as track 136 above) a seek time versus data location graph as shown in FIG. 2 results. Normal copying disk readers extract an essentially flat series of bits and write the bits at a relatively constant value. The disk drive will compensate for changes in the variable frequency of the pit and lands since the signature is written within the normal operating tolerances of the read drive. This results in the disk drive reading a standard stream of data without reference to the variation in the frequency of the pit and land patterns on the disk. During a copy operation, a disk reader will extract the data and a disk copier will write the data in a relatively unvarying format. Hence, the graph of FIG. 2 may result from a copy of a disk with a signature value.

Figure 3:
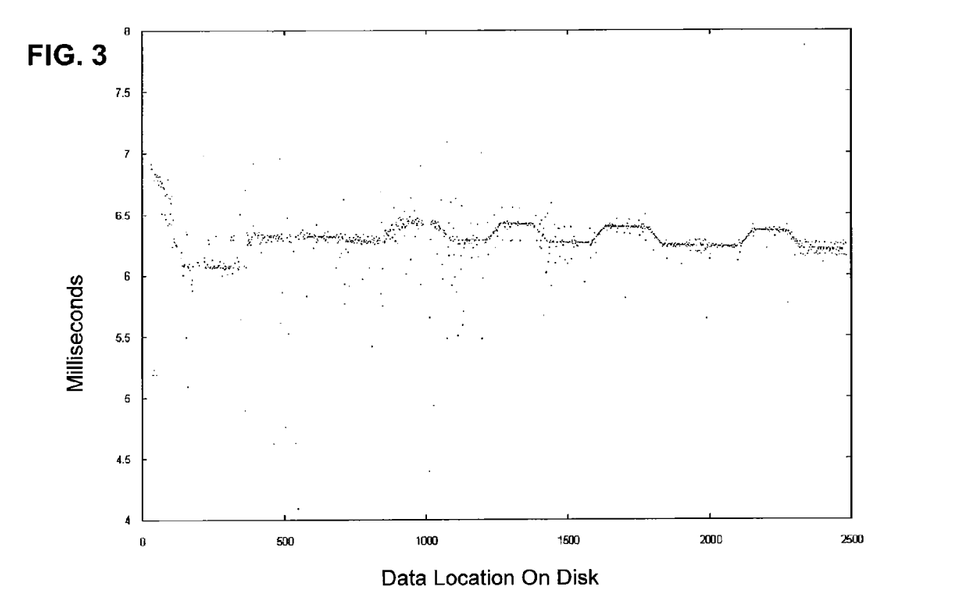
FIG. 3 is a graph of seek times to data locations on a disk for a genuine disk having an embedded frequency rate signature.

When the pit and land structure is varied, a sequential read of the disk shows variance in seek times relative to the physical location of data as illustrated in FIG. 3. The seek times to different physical locations on the disk vary according to the location of the data on the disk. This results in a variable latency pattern unique to the disk (or a run of disks created from a master disk having the variable latency pattern).

It will be noted that with certain types of discs, such as computer RAM and ROM discs, data is typically accessed in a noncontiguous fashion. That is, instead of continuously reading the disc from lead-in to lead-out, a disk drive head assembly is directed to move to different locations across the disc to output data from different data fields (blocks) as required by the host device.

In one embodiment, this ability to access different portions of the disk can be used to create a fingerprint key based on seek times which will be unique for the disk run, since the seek times between different points on the disk will vary according to the latency signature. Because the seek times can be determined using any disk reading device, a verification process running on a processing device can use this information, when matched with known good keys for a set of media, to verify the validity of the media. The key can be the seek times themselves, a value calculated from the seek times, or a hash of the seek times or calculated value.

Figure 4:
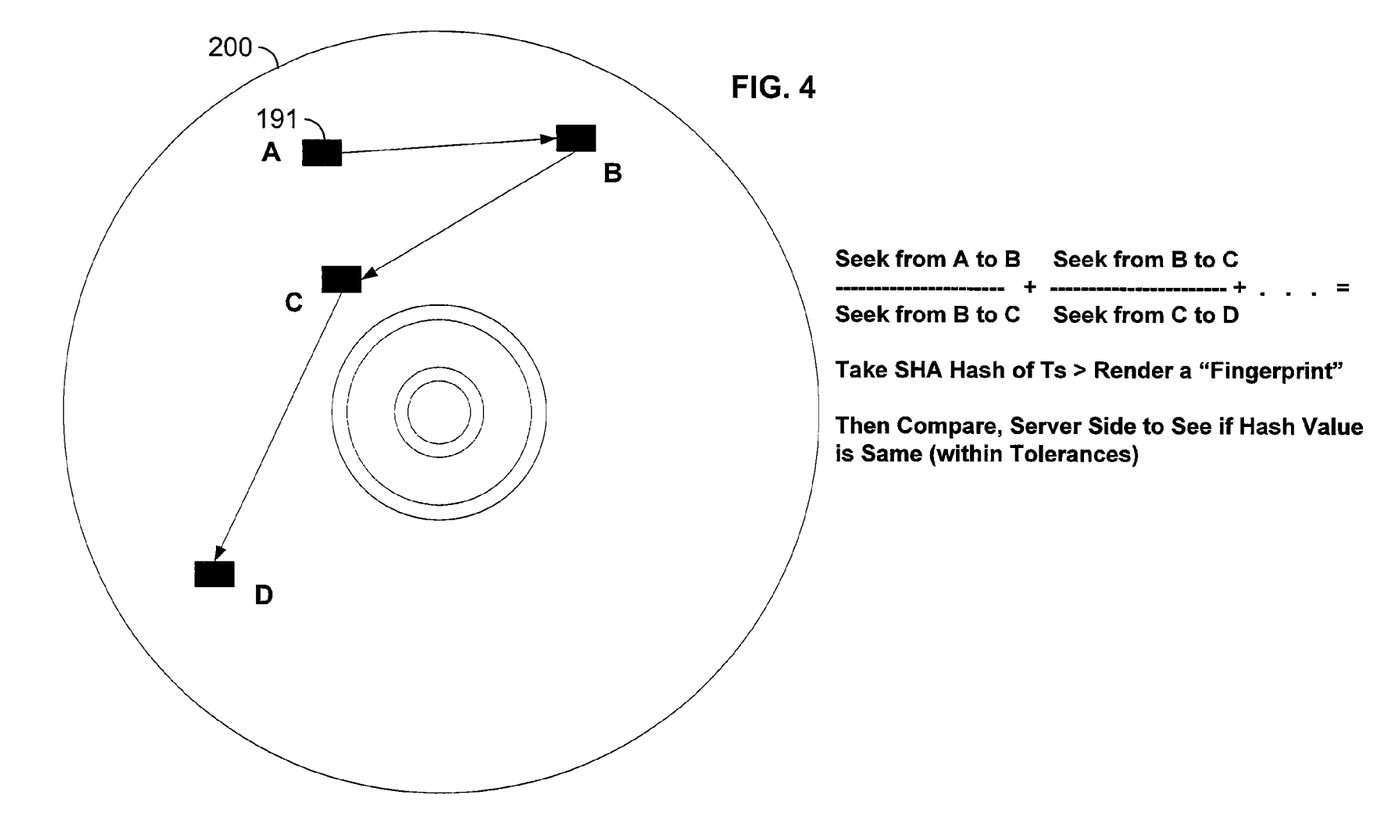
FIG. 4 is plan view of optical media illustrating a block header seek search pattern.

FIG. 4 illustrates a plan view of a disk 200 having physical markers A, B, C, and D which may, in one embodiment, represent block header locations on the disk. These block header locations comprise address information for data blocks stored on the disk, and are addressable by a read device of any conventional device utilized for reading an optical disk. Under the Yellow Book CD recording format, a disc is divided into sectors with each one consisting of 98 frames, or 2,352 bytes. Header information is contained in the first 16 bytes of each sector. Meanwhile, the header contains the location of each sector and what mode the data is recorded in. Addresses of sectors are expressed as minutes, seconds, and sectors (MM:SS:SS).

Block heaters A, B, C, and D shown in FIG. 4 are at physically distinct locations on disk 200. When a disk reader seeks between each of the block header locations, a numerical time value will result due to the variance in the pit and land variation from nominal. As will be understood, these seek times will be unique for each encoded frequency pattern and can be further varied by the seek pattern and sequence used. Hence, the frequency variation applied to disk 200 in addition to a block header seek sequence will generate a unique fingerprint key for disk 200 which can be used to determine whether or not the disk 200 is, in fact, a valid disk.

In one embodiment, the fingerprint key can simply be a sequence of one or more seek times between block headers, for example blocks A, B, C and D. These values can be arranged sequentially or in some variant order. Each time value between the blocks can be recorded and the collective set of values can defined a signature.

Alternatively, the key generation algorithm can be more complex, such as:

$$\frac{\text{Seek from } A \text{ to } B}{\text{Seek from } B \text{ to } C} + \frac{\text{Seek from } B \text{ to } C}{\text{Seek from } C \text{ to } D} + \ldots = \quad \text{Equation 1}$$

$$\text{Numeric Value} = Ts$$

The result of this formula (Ts) is a fingerprint key value which can then be utilized by the system of the present invention to verify the result.

In accordance with the invention, an element of randomness in the creation of the disk pit and land latency signature can be added to the original pattern, and/or to the seek sequence, and recorded on the disk (or disk run) by a manufacturer, which can then be used to authenticate the disk as genuine.

Figure 5:
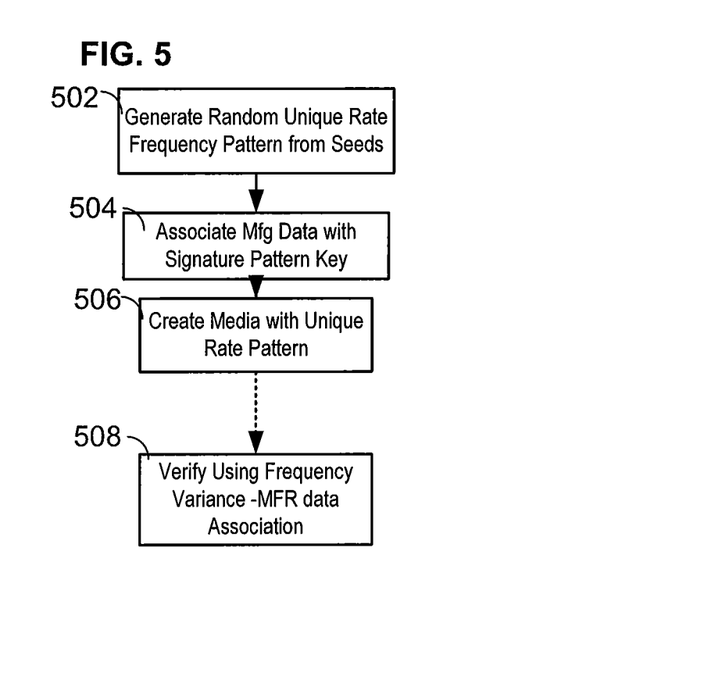
FIG. 5 is a flow chart illustrating a first embodiment of a method of the present invention.

FIG. 5 shows a general method of the present invention. At step 502, a unique latency pattern for the pit and land structure is generated. In one embodiment, the pattern is generated by providing a random number generation function which generates a pattern value input for the EFM writer as discussed herein. A random number generator is a computational or physical device designed to generate a sequence of numbers that does not have any easily discernable pattern, so that the sequence can be treated as being random. A computational random number generator is more accurately called a "pseudorandom" number generator, since the sequence is generated by a specific algorithm can be replicated exactly to yield an identical sequence. The see is a numeric value used in the random number generation algorithm to produce the random number. Computational random number algorithms can provide an asymmetric distribution or a symmetric distribution of random numbers. Both are suitable for use in the present invention.

In accordance with the invention, a random pattern value input will determine the latency pattern for the pit and land structure which will be written to a master disk. This glass master disk is used to create a subset of manufactured media. The unique fingerprint key value based on a pattern generated at step 502 is stored at step 504 along with manufacturing data (such as place, date, facility, media name, product, etc) for a master disk which is used to create a media set. The master disk is created in accordance with well-known techniques and the media set can be any of a number of media created—from one disk to entire disk run of a particular software type. Once the media information is stored, the master disk with the embedded pit and land structure is created at step 506. This master disk as discussed above can be utilized to create a media run. At step 508, which is generally performed at some later point in time, the end user media created using this master disk can be verified using the fingerprint key information associated with the manufacturing information. This verification step can comprise determining the pattern on the end user disk from the known information, and matching the fingerprint key value to known good values of seek times between various determination points.

Figure 6:
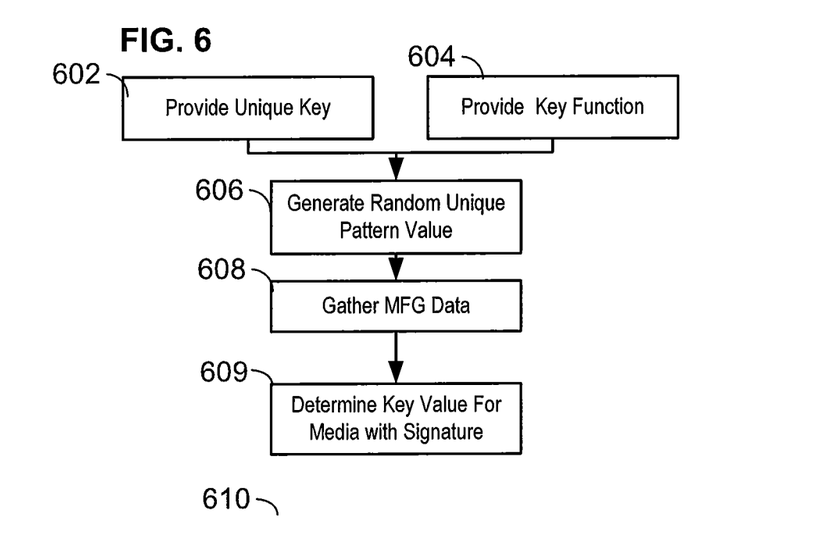
FIG. 6 is a flowchart illustrating a method for generating a unique rate frequency pattern from seed in accordance with the present invention.

FIG. 6 shows a method for creating a unique rate frequency pattern for pits and lands from seed values. In FIG. 6, a unique key 602 and a unique key random generation function 604 are shown. While a computational random number generation algorithm is shown, any form of random number generator may be used to create a random pattern of pit and land sizes. The unique key may be provided by a system manufacturer as a unique seed key for the generation algorithm. Alternatively, any random number generation algorithm which provides a unique random number for each of a number of master disks to be created can be used—the seed key need not come from a manufacturer.

At step 606, a unique pattern pit and land pattern is created from the unique key and the key function. This input value determines the "shape" of the pit and land pattern. With the same input string, identical patterns can be produced and consequently the seek times between the same points known. At step 606, the unique pattern will be unique for the disk master as discussed above, or may be unique for a single end run production media. At step 608, the manufacturing data for the key which will be used is gathered for association with information about the unique pattern. The manufacturing data can be any of a number of identifying means associated with the end production disk or the master used to produce the end productions disk or set of disks. For example, if the master disk is utilized to create a series of software products for a particular manufacturer, the pattern information will be associated with information specific to the software manufacturer, a particular manufacturing facility, the software product or data stored on the optical media, or other such information. At step 610, the manufacturing information is associated with the unique pattern information generated at step 606. This association can take any number of forms. The manufacturing information can be arranged in a tabular format having rows and columns identifying in one column the manufacturing information and in another the unique pattern input value or specific seek time values between specific points, or data strings calculated according to a particular seek function utilized between one or more specific points (headers) on the disk. As such, the identifying information can serve as additional validation data by classifying known good values according to the manufacturing information. In this example, it should be recognized that as long as the information from the key value (in whatever form) is known to the manufacturer, such information can be used to verify the optical media source of origin. This information will be later sent to the manufacturer or stored for use in the verification step 508.

In another embodiment, the association can occur by utilizing a seed key provided by the manufacturer to into a function which generates a known limited set of random values which may be identically reproduced by the manufacturer. In this embodiment, both the manufacturer and the production facility have a known limited set of disk signature values which in turn produce a limited set of fingerprint keys for master disks. In this context, the manufacturing information used in conjunction with the seed value need only be known to the manufacturer.

Figures 7, 8:
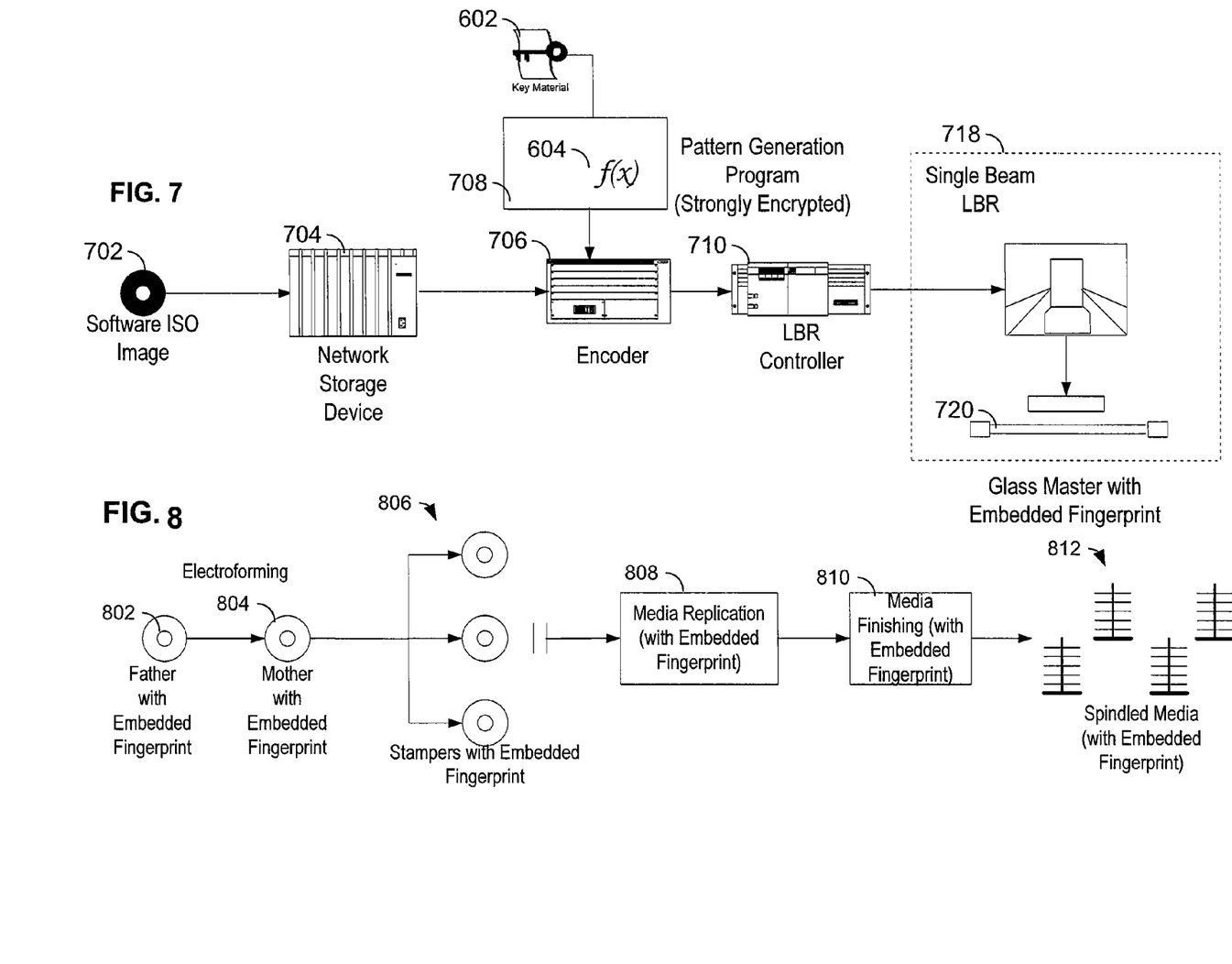
FIG. 7 illustrates creating a media master in accordance with the present invention.
FIG. 8 is a block diagram illustrating creation of end product media from the media master.

FIG. 7 illustrates the creation of a glass master disk 720 with an embedded unique fingerprint pattern created in the method of FIG. 6. A manufacturing process generally begins with the creation of an ISO image of the software 702. In general, an ISO image is a disk image (as prescribed by ISO standard ISO 9660) that comprises a file representing a one-to-one copy of a specific computer file system, most widely used for the compact disc medium (i.e an entire CD or DVD-ROM). The term "ISO image" or just "ISO" is sometimes used informally to refer to disk images in formats other than ISO 9660, and is used herein to refer to any seed image of a disk suitable for reproduction.

The originating image 702 can be stored on a network storage device 704. As will be generally understood by those skilled in the art, the network storage device 704 may be coupled to one or more encoders 706.

The encoder 706 is a pulse control system that allows manufacturing facilities to control pit geometry of the glass master at the laser beam recorder to create optical media. Manufacturing facilities can make duty cycle adjustments on leading and trailing edge timing, thereby adjusting individual pit lengths on the glass master. Adjustment in laser beam intensity can control the width of the pits, widening short run length pits or narrowing long run length pits. The encoder is coupled to a fingerprint generation apparatus 708. Apparatus 708 may be a processing device such as that described in FIG. 12 and incorporating modules and methods suitable for generating a random number from a seed value as described above.

The signature generation apparatus 708 is a processing device performing the random generation algorithm to create a unique value input for the encoder. The signature generation apparatus 708 may be incorporated into the encoder 708 or be a separate processing device communicating with the encoder. The encoder supplies an EFM signal to be recorded to a laser beam recorder (LBR) 710.

The LBR implements a disk mastering process which involves physical transfer of the data into the pits and lands. First, a layer of light-sensitive photoresist is spin-coated onto the clean glass master-disk 720 from a solvent solution. Then, the photoresist is exposed to a modulated beam of a short-wavelength light, which carries the encoded data, from the LBR. The laser beam recorder 718 emits a laser beam onto a glass master 720 that is rotated under the control of the encoder and laser beam controller at a constant or variable angular velocity by a recording engine (not shown). The laser beam in recorder 718 is modulated according to the signal provided by the encoder to record pits and lands corresponding to the signature pattern defined by the key generation algorithm. To vary the clock signal for the higher than usual frequency for a recording position, the recorded pits and lands will be shortened in respect to their usual length. To vary the clock signal for a lower than usual frequency per corresponding recording position, the recorded pits and lands will lengthen with respect to their usual length in said position. Following exposure, the master 720 is developed in a wet process by exposing it to the developer, which etches away exposed areas thus leaving the same pattern we will find later on the CD.

FIG. 8 shows the process of manufacturing end user media from a signature embedded glass master. Generally, a general manufacturing process from a glass master disk includes using a master disk 720 to create a "father" master disk and to create a "mother disk" 1004. In FIG. 8, the master 720 is coated (using electroplating technique) with a thick (about 300 um) metal layer to form a father master stamper—a negative replica of the disk. The photoresist layer is destroyed during this process. The father stamper is then coated with a thick metal layer to form the "mother" stamper and a plurality of production stampers 806. The much more durable production stampers are can be used for CD replication. Usually, a production stamper can be used to produce a few tens of thousands CDs before it wears out.

Finally, at 808, the process of injection molding is used to produce a surface of the compact disk. Hot plastic is injected into a mold, and then is pressed against the stamper and cooled, resulting in the CD. Other processes than injection molding could be used, but they all involve pressing the hot plastic against the stamper. Finally, the pits and lands on the surface of a CD are coated with a thin reflective metal layer (such as aluminum). Media finishing at 810 comprises applying lacquer or other labeling to the disk. This results in a plurality of spindled media with the embedded fingerprint provided thereon.

Figure 9:
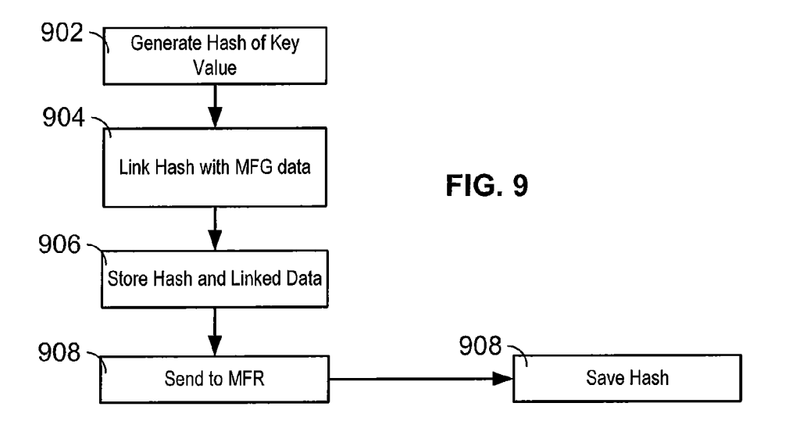
FIG. 9 is a method for storing manufacturing data with a signature key in accordance with the method of FIG. 5.

FIG. 9 shows one process for implementing step 504 of FIG. 5 of storing manufacturing data with information on the unique signature information. It will be recognized that numerous variations on how storage of the unique value and associated manufacturing information is performed. At step 902, a hashing step may be used to reduce the length of the signature or other unique value which needs to be stored. A hash function is used to convert the fingerprint key data from the raw data of the fingerprint key into a hash value. The MD5 and SHA-1 -2 algorithms are two popular algorithms for generating cryptographic hash functions. Hashing provides a rapid method for indexing the data, and encrypts the data for use in a verification process. In one embodiment, the hashed key information can be stored in hash tables to speed up the lookup of a record of information. Hashing can provide almost direct access to records, which means that, on average, a lookup can require just one or two probes into the memory or file containing the records.

As noted above, there are numerous variations in the definition of the master media's fingerprint key. In a further embodiment, step 902 is optional and no hash of the fingerprint key need be made. At step 904, the hash (or un-hashed) value is associated with manufacturing data for the spindled media which has been created 1020. The manufacturing data can be data concerning a particular run of media (such as a version of the media, a specialized application batch, or other identifiable manufacturing run), a run of particular brand or type of software, a media manufacturing run coming from a particular facility, or any other distinguishing feature of the particular media. At step 906, the associated manufacturing and signature information is stored. Storage of the information at step 906 is not required but may be useful in providing an upload of a sequence of multiple sets of manufacturing information at step 908, or for future use at the manufacturing facility. At step 908, the media information may be transmitted to the manufacturer or another entity which will use the information for verification purposes. It should be readily understood that sending the media to the manufacturer can include electronic delivery via an open or encrypted connection via the Internet. Once at the manufacturer or other validation entity, the signature and manufacturing information is stored for later use.

Figure 10:
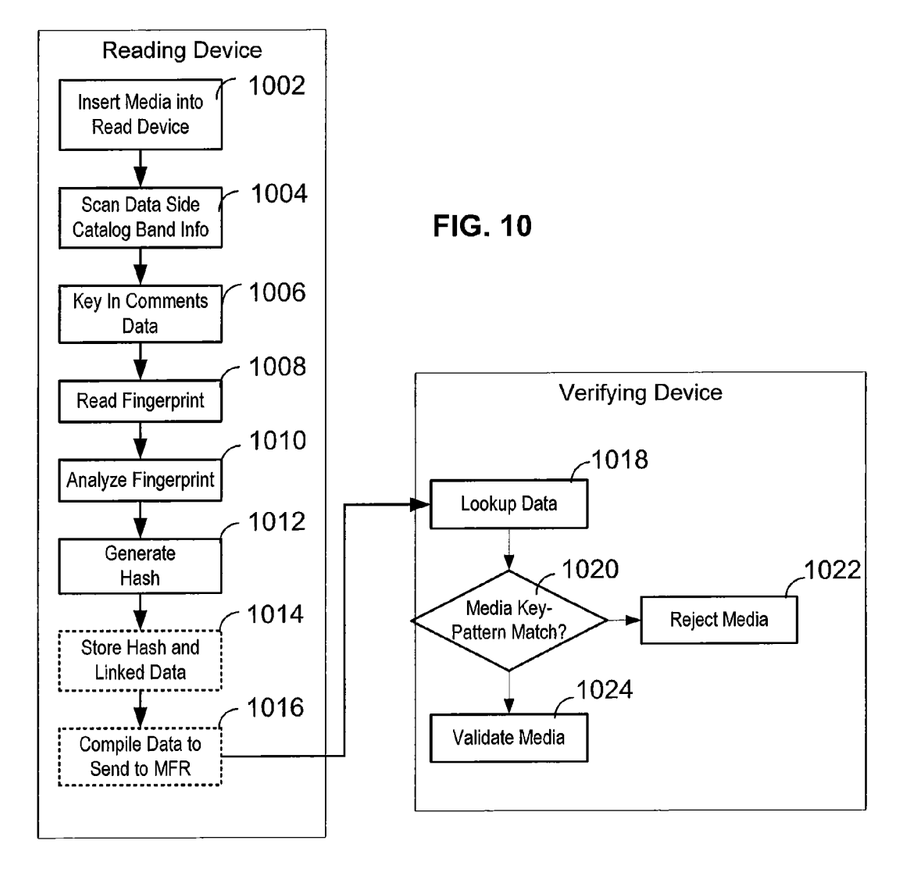
FIG. 10 is a flowchart illustrating a method for verifying media using the signature key in accordance with the present invention.
Figure 11:
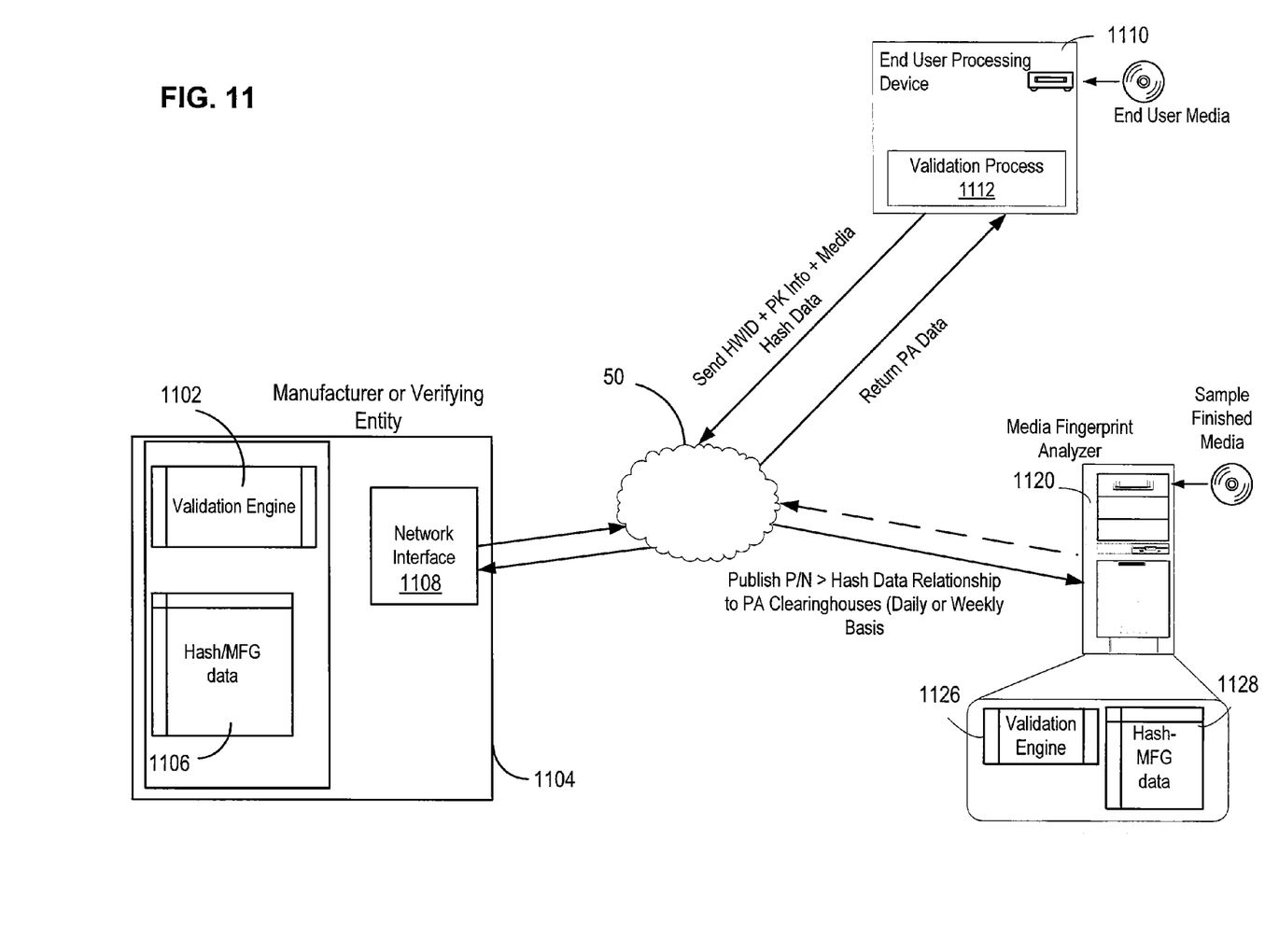
FIG. 11 illustrates a networked system suitable for uploading and downloading verification information in accordance with the present invention.

FIG. 10 is a flow chart illustrating a method of the present invention for reading and verifying the media using the frequency variance information (step 508). FIG. 11 illustrates communication between a number of exemplary systems which in one embodiment operate in concert to perform the method of FIG. 10. FIG. 11 shows a manufacturer or verifying entity validation server 1104 coupled via a network 50, including for example the Internet, to end user processing device 1110 or a processing device 1120 specially adapted to analyze the media fingerprint. The validation server 1104 may include, for example, validation engine 1102 and table 1104 storing fingerprint key values (in a hash table or raw format) associated with manufacturing data utilized in the aforementioned disk mastering process. As discussed with respect to FIG. 12, a processing device 1110 or 1120 includes a media reader. The process described in FIG. 10 operates on end user supplied media using a validation process 1112 operating on computer 1110 or on analyzer 1120. The media fingerprint analyzer 920 is used, for example, by agencies seeking to determine whether or not the information in a computer package is genuine or not.

As shown in FIG. 10, certain steps are preformed by a reading device and a verifying device. These may be physically separate devices such as device 1110 and 1104, or the media verification process of FIG. 10 may be performed locally on the processing device reading the test media, such as device 1120. In the latter case, known good values are provided to the analyzer 1120 by the validating entity.

With reference to FIG. 10, at step 1002, media is inserted into a disk reader such as processing device 1110 or media analyzer 1120. The media analyzer may be, for example, an automated data processing media analyzer 1120 specifically adapted to determine whether the media is genuine, and may be operated at a media clearinghouse or other entity to process the validation sequence locally on the processing device. In an end user device 1110, a verification process 1112 may run at some portion of a software installation method when the operating system detects that the media has been inserted into the device 1110 for the first time and/or at some other time. The verification process can use the user device's media reader to determine the unique fingerprint pattern from the media and utilize it in the method of FIG. 10. As explained below, the verification process 1112 determines a fingerprint key and forwards it with other information to the verifying entity 1104. On the media analyzer, key information provided by the verifying entity is used to run a local verification process 1120

At step 1004, the data-side catalog band information for the optical media is read. The information in the catalog band may provide manufacturing information for which can be correlated with that used for the verification process. At step 1006, optionally, any comments data can be keyed in. Comment data may include, for example, comments by a tester using the tester or registration or product code information for the verification process. For example, current product activation processes for commercial software generally require users to input a manufacturer supplied product code in order to unlock the installation process. Product activation generally refers to a method where a software application hashes hardware serial numbers and an ID number specific to the product's license (a product key) to generate a unique activation ID. The activation ID, along with the product key, is sent to the manufacturer to verify the authenticity of the product key and determine that the product key is not being used for multiple installations. This information may be used along with the catalog band information to ensure validity of the media source. In alternative embodiments, this step need not be used.

At step 1008, the frequency fingerprint is read. As noted above, this may comprise determining a sequence of seek times between selected block headers to test absolute seek times against a stored seek time profile or calculated values from the seek time signatures.

At step 1010 the fingerprint may be analyzed. This can include, for example, calculating a signature value as described above. Alternatively, step 1010 may simply compile the fingerprint key from seek values read at 1004. At step 1012, a hash of the fingerprint key is generated if hashes are used as discussed above. The foregoing steps may be performed by both validation process 1112 and validation engine 1126. Steps 1014 and 1016 need only be performed if verification is to occur at the manufacturer or verifying entity.

At step 1014, the hash value is stored along with data identifying the media at step 1014. This data is compiled at step 1016 and sent to the manufacturer or verifying entity 1104. Compiling may include encrypting the data for transfer to the verifying entity. For example, process 1112 sends the hardware ID, package information and media hash data to the network interface of manufacturer 1100. The manufacturer can return product activation data to the machine 1110 to allow or disallow the installation process via the verification process.

Steps 1018, 1020, 1022 and 1024 may be performed by the verifying entity using validation engine 1102 and hash table 1106 or on the analyzer 1122 using engine 1126 and table 1128. Engine 1102 or 1126 looks up the hash data at step 1018, and the data hash is checked against a lookup table which includes a hash and corresponding manufacturing information. The results are compared at step 1020. If the fingerprint key and manufacturing information match, the media is validated at step 1024, if not the media is rejected at step 1022. Information in the local hash table 1128 can be updated on a daily, weekly or other regular or semi-regular basis. Matching of hash values may be performed within some tolerance.

It will be recognized that any number of alternatives to the verification step may be implemented. For example, once the result of the verification process is returned to the verifying device, the device may implement one or more actions based on such result—the device may refuse to install program software stored on the optical media, notify the user, or disable the software stored or installed on the device from operating.

In still another embodiment, manufacturing data may be associated with seed keys used to generate random input values for various manufacturing runs of disks, and the manufacturing information associated with the seed keys prior to provision of the seed to the master disk manufacturer. Using identical random number generation algorithms within a given range will allow valid keys to be associated with the manufactured media without the need to share information subsequent to manufacture of the master and end media. The resulting random inputs for the encoder will likewise result in a known range of unique signature keys (based on seek times or equivalent patterns). Manufacturing data can be used to identify known valid media within such ranges.

Figure 12:
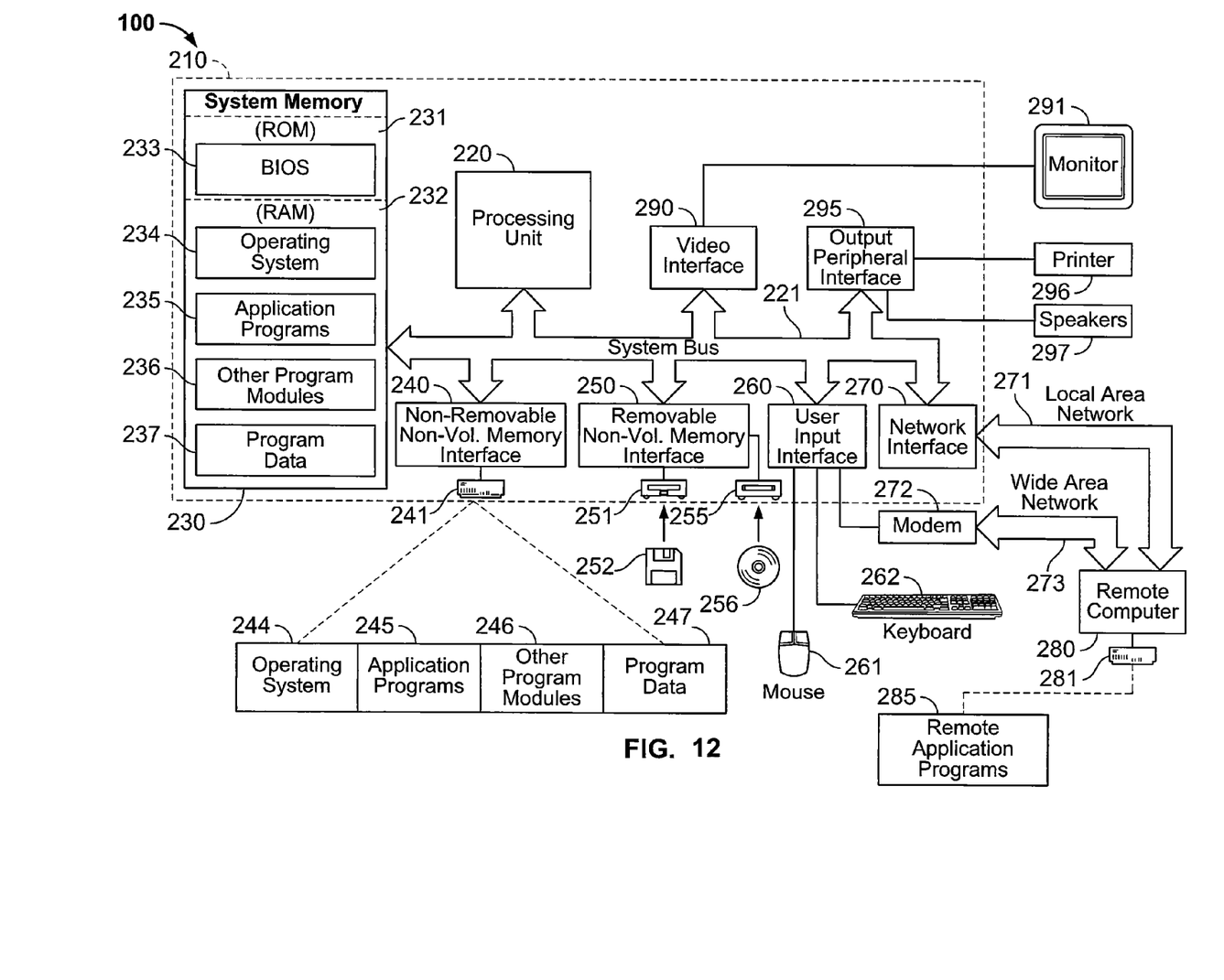
FIG. 12 is a depiction of a processing device suitable for implementing any of the processing devices disclosed in the present application.

FIG. 12 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for verifying the authenticity of an optical storage device, comprising:
    reading a randomly generated signature key value for the optical storage device;
    determining manufacturing information for the optical storage device;
    matching randomly generated signature key values and manufacturing information with known valid key to determine the authenticity of the device;
    creating a plurality of optical storage disks each having said randomly generated signature key value, wherein said step of creating a plurality of optical storage disks comprises the step of generating a random input value for an encoder controlling a disk mastering process.

2. The method of claim 1 wherein the step of creating includes recording a disk data image using the random input value to vary the size of pits and lands on the disk thereby creating a randomly generated latency signature.

3. The method of claim 1 wherein the step of creating includes creating a signature key based on at least two seek times.

4. The method of claim 1 further including the step of creating a hash of signature value and storing the hash of signature value.

5. The method of claim 4 wherein the step of matching comprises matching the hash of signature value with known good hash values.

6. The method of claim 1 wherein the step of reading is performed by an end user and the step of matching is performed by a validating entity.

7. A method for verifying the authenticity of an optical storage device, comprising:
    reading a randomly generated signature key value for the optical storage device;
    matching randomly generated signature key values with known valid keys to determine the authenticity of the device; and
    creating a plurality of optical storage disks each having said randomly generated signature key value, wherein said step of creating a plurality of optical storage disks comprises the step of generating a random input value for an encoder controlling a disk mastering process.

8. The method of claim 7 further including calculating the signature value based on an algorithm using said seek times.

9. The method of claim 7 further comprising the step of creating a hash of signature value and storing the hash of signature value.

10. The method of claim 9 wherein the step of matching comprises matching the hash of signature value with known good hash values.

11. The method of claim 7 wherein the step of reading is performed by an end user and the step of matching is performed by a validating entity.

\* \* \* \* \*